US012358447B2

(12) United States Patent
Boddi et al.

(10) Patent No.: US 12,358,447 B2
(45) Date of Patent: Jul. 15, 2025

(54) VEHICULAR DRIVING ASSISTANCE SYSTEM WITH ADAPTABLE/REPLACEABLE CONTROLLER CARDS

(71) Applicant: Magna Electronics Inc., Auburn Hills, MI (US)

(72) Inventors: Suresh Boddi, New Hudson, MI (US); Alan M. Cordeiro, Farmington Hills, MI (US); Sujith Gurram, Orion Township, MI (US)

(73) Assignee: Magna Electronics Inc., Auburn Hills, MI (US)

( * ) Notice: Subject to any disclaimer, the term of this patent is extended or adjusted under 35 U.S.C. 154(b) by 287 days.

(21) Appl. No.: 18/303,238

(22) Filed: Apr. 19, 2023

(65) Prior Publication Data

US 2023/0339418 A1 Oct. 26, 2023

Related U.S. Application Data

(60) Provisional application No. 63/363,274, filed on Apr. 20, 2022.

(51) Int. Cl.
*B60R 16/02* (2006.01)
*B60R 16/023* (2006.01)
*G07C 5/08* (2006.01)
*B60R 25/30* (2013.01)

(52) U.S. Cl.
CPC ........ *B60R 16/0232* (2013.01); *G07C 5/0808* (2013.01); *B60R 25/305* (2013.01)

(58) Field of Classification Search
CPC . B60R 16/0232; B60R 25/305; G07C 5/0808; G06V 20/56
See application file for complete search history.

(56) References Cited

U.S. PATENT DOCUMENTS

| | | |
|---|---|---|
| 4,056,696 A | 11/1977 | Meyerle et al. |
| 4,862,594 A | 9/1989 | Schierbeek et al. |
| 4,930,742 A | 6/1990 | Schofield et al. |
| 4,937,945 A | 7/1990 | Schofield et al. |
| 5,131,154 A | 7/1992 | Schierbeek et al. |
| 5,239,586 A | 8/1993 | Marui |
| 5,255,442 A | 10/1993 | Schierbeek et al. |
| 5,432,496 A | 7/1995 | Lin |

(Continued)

*Primary Examiner* — Michael V Kerrigan
(74) *Attorney, Agent, or Firm* — HONIGMAN LLP

(57) ABSTRACT

A vehicular sensing system includes a plurality of sensors disposed at a vehicle equipped with the vehicular sensing system and a plurality of zonal aggregators each receiving respective sensor data captured by at least two respective sensors of the plurality of sensors and each aggregating its received sensor data into respective aggregated sensor data. The system includes an electronic control unit (ECU) that receives the respective aggregated sensor data from each respective zonal aggregator. The system includes a plurality of daughter cards, each removably connected to a respective zonal aggregator. Each respective daughter card includes a respective controller that controls a respective component of the equipped vehicle and the respective component controlled by the respective controller is based on a location of the respective zonal aggregator and respective daughter card within the equipped vehicle.

23 Claims, 3 Drawing Sheets

(56) References Cited

U.S. PATENT DOCUMENTS

| | | |
|---|---|---|
| 5,550,677 A | 8/1996 | Schofield et al. |
| 5,632,092 A | 5/1997 | Blank et al. |
| 5,670,935 A | 9/1997 | Schofield et al. |
| 5,798,688 A | 8/1998 | Schofield |
| 5,877,897 A | 3/1999 | Schofield et al. |
| 5,924,212 A | 7/1999 | Domanski |
| 5,940,503 A | 8/1999 | Palett et al. |
| 5,949,331 A | 9/1999 | Schofield et al. |
| 5,971,552 A | 10/1999 | O'Farrell et al. |
| 6,026,162 A | 2/2000 | Palett et al. |
| 6,082,881 A | 7/2000 | Hicks |
| 6,175,300 B1 | 1/2001 | Kendrick |
| 6,227,689 B1 | 5/2001 | Miller |
| 6,243,003 B1 | 6/2001 | DeLine et al. |
| 6,278,377 B1 | 8/2001 | DeLine et al. |
| 6,329,925 B1 | 12/2001 | Skiver et al. |
| 6,420,975 B1 | 7/2002 | DeLine et al. |
| 6,428,172 B1 | 8/2002 | Hutzel et al. |
| 6,477,464 B2 | 11/2002 | McCarthy et al. |
| 6,648,477 B2 | 11/2003 | Hutzel et al. |
| 6,678,614 B2 | 1/2004 | McCarthy et al. |
| 6,690,268 B2 | 2/2004 | Schofield et al. |
| 6,766,233 B2 | 7/2004 | Odinak et al. |
| 6,824,281 B2 | 11/2004 | Schofield et al. |
| 6,902,284 B2 | 6/2005 | Hutzel et al. |
| 6,946,978 B2 | 9/2005 | Schofield |
| 7,004,593 B2 | 2/2006 | Weller et al. |
| 7,012,727 B2 | 3/2006 | Hutzel et al. |
| 7,167,796 B2 | 1/2007 | Taylor et al. |
| 7,188,963 B2 | 3/2007 | Schofield et al. |
| 7,253,723 B2 | 8/2007 | Lindahl et al. |
| 7,289,037 B2 | 10/2007 | Uken et al. |
| 7,306,276 B2 | 12/2007 | Berberich et al. |
| 7,308,341 B2 | 12/2007 | Schofield et al. |
| 7,329,013 B2 | 2/2008 | Blank et al. |
| 7,370,983 B2 | 5/2008 | DeWind et al. |
| 7,526,103 B2 | 4/2009 | Schofield et al. |
| 7,657,052 B2 | 2/2010 | Larson et al. |
| 7,881,496 B2 | 2/2011 | Camilleri et al. |
| 7,937,667 B2 | 5/2011 | Kramer et al. |
| 12,175,578 B1 * | 12/2024 | Campbell ............... G06T 13/00 |

* cited by examiner

VEHICULAR DRIVING ASSISTANCE SYSTEM WITH ADAPTABLE/REPLACEABLE CONTROLLER CARDS

CROSS REFERENCE TO RELATED APPLICATION

The present application claims the filing benefits of U.S. provisional application Ser. No. 63/363,274, filed Apr. 20, 2022, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

A vehicular sensing system includes a plurality of sensors disposed at a vehicle equipped with the vehicular sensing system. Each sensor of the plurality of sensors captures respective sensor data. The system includes a plurality of zonal aggregators, wherein each zonal aggregator of the plurality of zonal aggregators receives respective sensor data captured by at least two respective sensors of the plurality of sensors. Each zonal aggregator of the plurality of zonal aggregators aggregates its received sensor data into respective aggregated sensor data. The system includes an electronic control unit (ECU) with electronic circuitry and associated software. The ECU receives the respective aggregated sensor data from each respective zonal aggregator of the plurality of zonal aggregators and the electronic circuitry of the ECU includes a processor for processing the received aggregated sensor data. The system includes a plurality of daughter cards each removably connected to a respective zonal aggregator of the plurality of zonal aggregators. Each respective daughter card includes a respective controller, and the respective controller controls a respective component of the equipped vehicle. The respective component controlled by the respective controller is based on a location of the respective zonal aggregator and respective daughter card within the equipped vehicle.

These and other objects, advantages, purposes and features of the present invention will become apparent upon review of the following specification in conjunction with the drawings.

DESCRIPTION OF THE PREFERRED EMBODIMENTS

A vehicle vision system and/or driver or driving assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
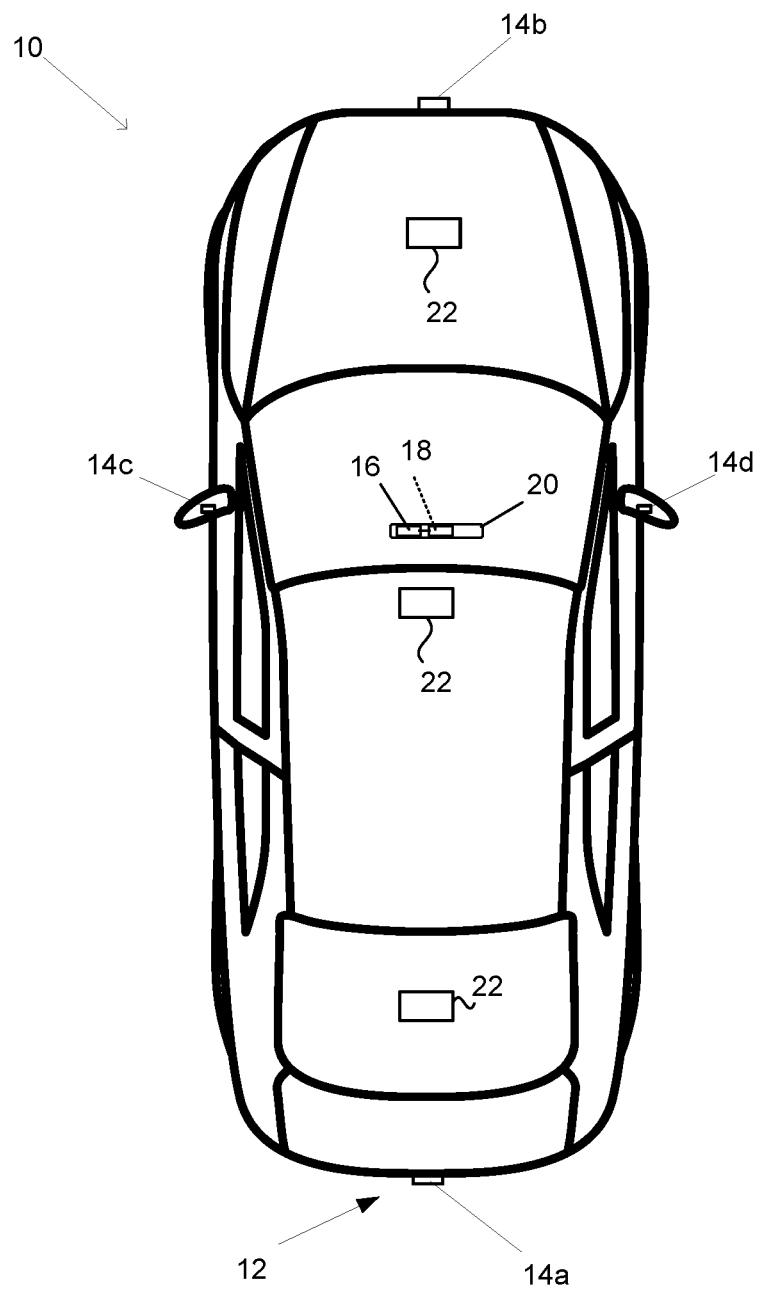
FIG. 1 is a plan view of a vehicle with a vision system that incorporates cameras.

Referring now to the drawings and the illustrative embodiments depicted therein, a vehicle 10 includes an imaging system or vision system 12 that includes at least one exterior viewing imaging sensor or camera, such as a rearward viewing imaging sensor or camera 14a (and the system may optionally include multiple exterior viewing imaging sensors or cameras, such as a forward viewing camera 14b at the front (or at the windshield) of the vehicle, and a sideward/rearward viewing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) 18 having electronic circuitry and associated software, with the electronic circuitry including a data processor or image processor that is operable to process image data captured by the camera or cameras, whereby the ECU may detect or determine presence of objects or the like and/or the system provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle. The vehicle may include one or more zonal aggregators 22 that aggregate data signals from sensors in the vicinity of the zonal aggregator 22 and provide the aggregated signals to, for example, the ECU 18. For example, the zonal aggregators 22 aggregate image data or other data captured and/or processed by the cameras 14a-d and/or other sensors, such as radar sensors, ultrasonic sensors, lidar, accelerometers, temperature sensors, etc.

As the modules for Automated Driver Assistance Systems (ADAS) continue to offer greater levels of autonomy and offload more of the driving workload from the human driver, these systems need to connect to an increasingly larger numbers of sensors, such as cameras, radar modules, lidar, ultrasonic sensors, etc.

In early implementations of ADAS modules, most sensors were simply directly connected to the central ADAS module. In newer vehicle designs, as the number of sensors continues to increase, it becomes infeasible to have that many direct connections to the ADAS module (e.g., the ADAS module cannot support sufficient direct connections (i.e., insufficient I/O)). Accordingly, implementations herein enable data from multiple sensors in any one physical region of the vehicle (i.e., zone of the vehicle to be directly connect to a local sub-module (i.e., a zonal aggregator 22) which aggregates all the sensor data into one or more very high speed connection(s) to the central ADAS module.

Because these zonal sensor data aggregators 22 may be scattered around the vehicle (e.g., disposed such as to be near or co-located with different groups of sensors), the zonal aggregators may include a few additional components in order to include functionality for controlling any vehicle peripheral components in their immediate vicinity (e.g., door lock actuators, window motors, tail lights, stop light lamps, turn signal lamps, rear trunk unlock actuators, power tailgate motors, etc.).

To allow the greatest flexibility, the input and output connections of each zonal aggregator module may be tailored to the physical location of the respective zonal aggregator and the components (i.e., sensors and/or control mechanisms) closest to the respective zonal aggregator. The zonal aggregators 22 may be configured to host multiple different daughter card modules, each daughter card module with different combinations of input and out connections specifically tailored to interface with the components closest to the respective zonal aggregator that the zonal aggregator is to control or receive information from. A large variety of modules (i.e., many modules with different functionality) will also allow the daughter card modules to be tailored to the needs of different vehicle manufacturers (OEMs).

Figure 2:
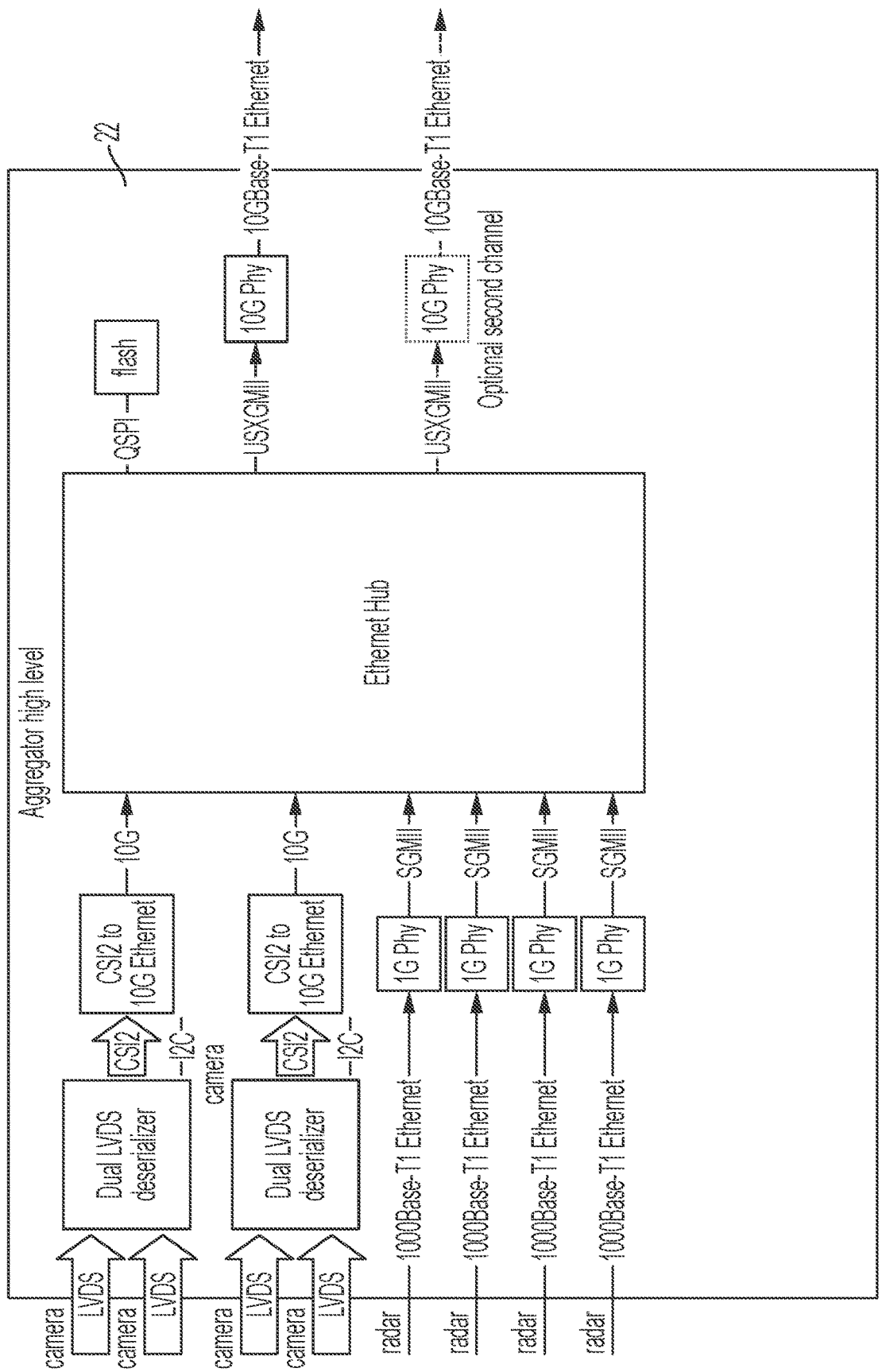
FIG. 2 is a schematic view of a zonal aggregator.

Referring now to FIG. 2, an exemplary zonal aggregator 22 aggregates multiple cameras (e.g., four or more cameras, such as forward-viewing cameras mounted at a windshield and/or front bumper of the vehicle, rear-viewing cameras, and/or one or more surround view cameras, such as cameras disposed at side-view mirrors of the vehicle) and multiple radar modules (e.g., four or more radar modules, such as corner radar sensors disposed at the corners of the vehicle). The types and quantities of sensors are purely exemplary, and the zonal aggregator may aggregate any number of any type of sensor (e.g., image sensors, radar sensors, lidar, ultrasonic sensors, wheel speed sensors, etc.). In this example, the zonal aggregator includes components to aggregate the sensor data onto one or more Ethernet channels. For example, the zonal aggregator includes serializers/deserializers (e.g., LVDS deserializers), PHYS, hubs, or any other components to aggregate the data from each of the various sensors onto one or more high-speed (e.g., Ethernet) communication channels. In this example, all of the data from the various sensors (i.e., the cameras and the radar sensors) are aggregated onto one or two 10 Gigabit Ethernet channels using an Ethernet hub. The zonal aggregator may include non-volatile memory (e.g., flash) to store parameters or configuration locally.

Figure 3:
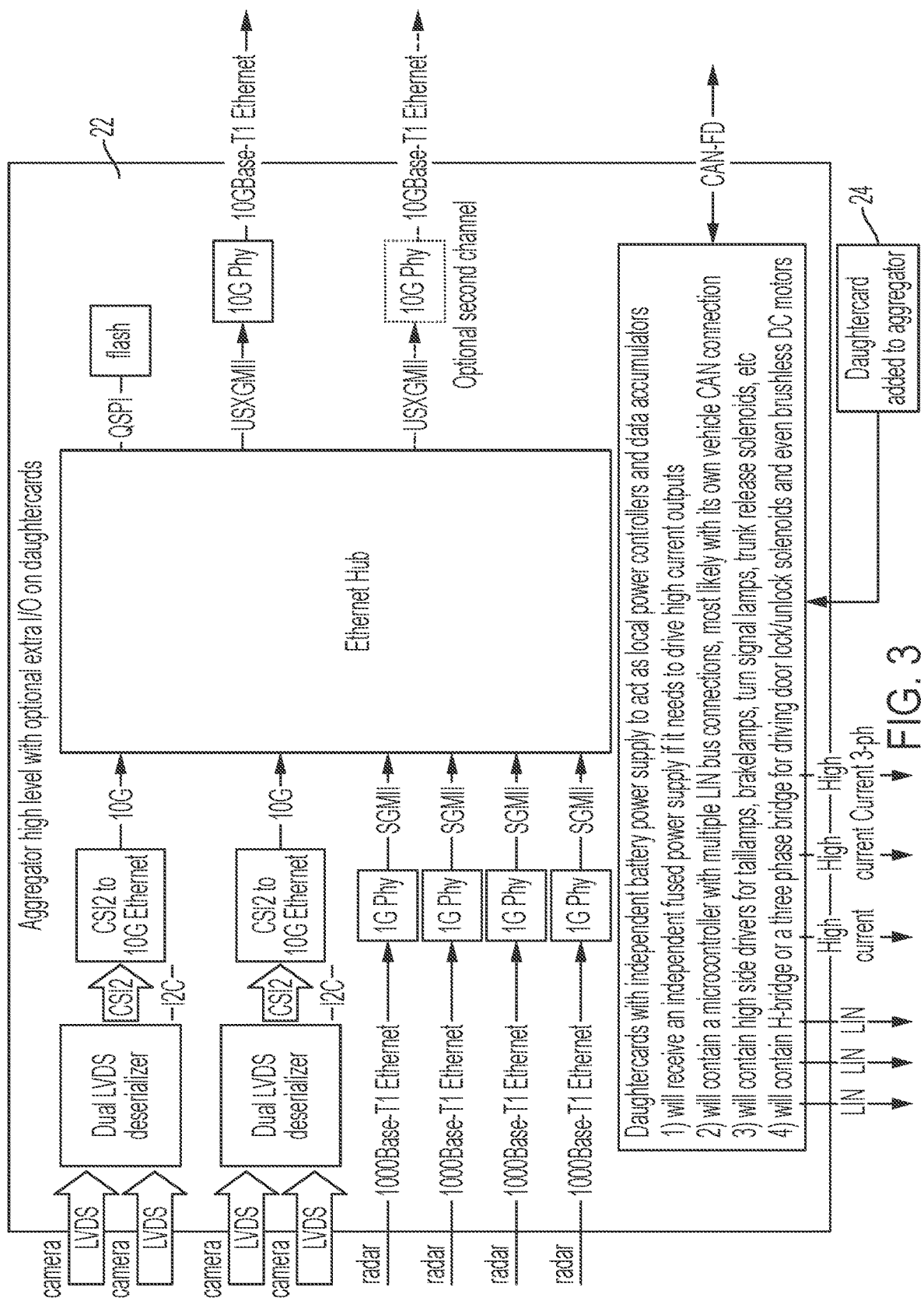
FIG. 3 is a schematic view of the zonal aggregator of FIG. 2 with a daughter card.

Referring now to FIG. 3, the zonal aggregator 22 in this example includes a daughter card 24 removably connected to the zonal aggregator (e.g., via an electrical connector or wiring harness). In this example, the daughter card 24 includes a microcontroller to receive commands from the rest of the vehicle. The daughter card may also control an actuator and load outputs and/or perform diagnostics on the components themselves. The daughter card, in some examples, includes an independently fused power supply to allow the daughter card to drive high current and high wattage loads and high current drivers for loads such as lamps and solenoids. Optionally, the daughter card includes components such as one or more H-bridges or three phase bridge drivers to drive solenoids, three phase brushless motors, linear motor actuators, and the like. Each daughter card may include a different design with each daughter card customized to control specific devices and loads (e.g., the devices and loads located in closest proximity to the respective zonal aggregator the daughter card is connected to). Optionally, each daughter card has a common footprint to fit into the space allocated by the common zonal aggregator. Thus, the daughter cards allow each common zonal aggregator to be tailored to the specific vehicle and specific location of the zonal aggregator within the vehicle (i.e., which sensors and loads the zonal aggregator is near) using a single common zonal aggregator design. That is, the daughter cards may allow each zonal aggregator 22 to be tailored for a particular location/use within the vehicle without having to maintain separate zonal aggregator designs.

Thus, as advanced driver assistance systems grow in complexity and functionality in newer vehicles, and the number of ADAS sensors in these vehicles similarly increases, it is advantageous to combine the data from sensors in each region/zone of a vehicle at a sensor data aggregator module (i.e., a zonal aggregator) and send the aggregated data on to the ADAS controller. This reduces the connections required by the ADAS controller, decreasing cost and complexity. The data may be aggregated on any appropriate connection, such as Ethernet, CAN, RS-232, I2C, SPI, USB, etc. Because zonal aggregators may be scattered throughout the vehicle so that each is conveniently close to the sensors whose data they are aggregating, it is advantageous to utilize these modules via interfacing with other automotive components in their immediate vicinity. For example, the zonal actuators may control or monitor components such as door lock actuators, window motors, tail lights, stop light lamps, turn signal lamps, rear trunk unlock actuators, power tailgate motors, etc.

Optionally, because the components surrounding each aggregator depend on the location of the zonal aggregator within the vehicle, a portion of the desired functionality for each zonal aggregate may be different. To avoid designing and building different zonal aggregators for each location (which each have some overlapping functionality), instead each zonal aggregator may allow for connection of one or more daughter cards that may be physically integrated into the zonal aggregator (e.g., via a high-speed connector) that include the functionality appropriate for the components near the zonal aggregator. For example, when a zonal aggregator is located near one or more high-powered lamps (e.g., headlights or the like), the daughter card may include an independent power supply and/or high side drivers to power the lamps without such components needed to be included on the common zonal aggregator card (thus wasting space/cost when the zonal aggregator does not need to control such components or requiring a separate zonal aggregator design). Providing unique functionality by means of unique daughter cards has the added advantage of easily tailoring these daughter cards to match the unique component variation from original equipment manufacturer (OEM) to OEM.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S.

Pat. Nos. 10,099,614 and/or 10,071,687, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. The imaging array may comprise a CMOS imaging array having at least 300,000 photosensor elements or pixels, preferably at least 500,000 photosensor elements or pixels and more preferably at least one million photosensor elements or pixels or at least three million photosensor elements or pixels or at least five million photosensor elements or pixels arranged in rows and columns. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular sensing system, the vehicular sensing system comprising:
    a plurality of sensors disposed at a vehicle equipped with the vehicular sensing system, each sensor of the plurality of sensors capturing respective sensor data;
    a plurality of zonal aggregators, wherein each zonal aggregator of the plurality of zonal aggregators receives respective sensor data captured by at least two respective sensors of the plurality of sensors;
    wherein each zonal aggregator of the plurality of zonal aggregators aggregates its received sensor data into respective aggregated sensor data;
    an electronic control unit (ECU) comprising electronic circuitry and associated software;
    wherein the ECU receives the respective aggregated sensor data from each respective zonal aggregator of the plurality of zonal aggregators;
    wherein the electronic circuitry of the ECU comprises a processor for processing the received aggregated sensor data;
    a plurality of daughter cards, wherein each daughter card of the plurality of daughter cards is removably connected to a respective zonal aggregator of the plurality of zonal aggregators; and
    wherein each respective daughter card comprises a respective controller, and wherein the respective controller controls a respective component of the equipped vehicle, and wherein the respective component controlled by the respective controller is based on a location of the respective zonal aggregator and respective daughter card within the equipped vehicle.

2. The vehicular sensing system of claim 1, wherein the respective component of the equipped vehicle comprises one selected from the group consisting of (i) an actuator, (ii) a motor, and (iii) a light source.

3. The vehicular sensing system of claim 1, wherein at least one of the plurality of daughter cards comprises a power supply independent from the respective zonal aggregator.

4. The vehicular sensing system of claim 1, wherein each zonal aggregator aggregates its received sensor data onto an Ethernet channel.

5. The vehicular sensing system of claim 1, wherein at least one daughter card of the plurality of daughter cards performs a diagnostic test on the respective component of the equipped vehicle.

6. The vehicular sensing system of claim 1, wherein the plurality of zonal aggregators comprises (i) a first zonal aggregator disposed at a first location within the equipped vehicle and (i) a second zonal aggregator disposed at a second location within the equipped vehicle different than the location of the first zonal aggregator, and wherein a first daughter card of the plurality of daughter cards is removably connected to the first zonal aggregator and comprises a first controller different from a second controller of a second daughter card of the plurality of daughter cards that is removably connected to the second zonal aggregator, and wherein the first controller controls a first component of the equipped vehicle and the second controller controls a second component of the equipped vehicle, and wherein the first component is different than the second component.

7. The vehicular sensing system of claim 6, wherein the first component is located closer to the first zonal aggregator than the second zonal aggregator, and wherein the second component is located closer to the second zonal aggregator than the first zonal aggregator.

8. The vehicular sensing system of claim 6, wherein the first zonal aggregator and the second zonal aggregator are the same, and wherein the first daughter card and the second daughter card are different.

9. The vehicular sensing system of claim 1, wherein the plurality of sensors comprises a plurality of radar sensors.

10. The vehicular sensing system of claim 1, wherein the plurality of sensors comprises a plurality of lidar sensors.

11. The vehicular sensing system of claim 1, wherein the plurality of sensors comprises a plurality of ultrasonic sensors.

12. The vehicular sensing system of claim 1, wherein the plurality of sensors comprises a plurality of cameras.

13. The vehicular sensing system of claim 1, wherein the plurality of sensors comprises (i) at least one camera and (ii) at least one radar sensor.

14. The vehicular sensing system of claim 1, wherein at least one daughter card of the plurality of daughter cards comprises at least one bridge driver.

15. A vehicular sensing system, the vehicular sensing system comprising:
a plurality of sensors disposed at a vehicle equipped with the vehicular sensing system, each sensor of the plurality of sensors capturing respective sensor data, wherein the plurality of sensors comprises a plurality of radar sensors;
a plurality of zonal aggregators, wherein each zonal aggregator of the plurality of zonal aggregators receives respective sensor data captured by at least two respective sensors of the plurality of sensors;
wherein each zonal aggregator of the plurality of zonal aggregators aggregates its received sensor data into respective aggregated sensor data;
an electronic control unit (ECU) comprising electronic circuitry and associated software;
wherein the ECU receives the respective aggregated sensor data from each respective zonal aggregator of the plurality of zonal aggregators;
wherein the electronic circuitry of the ECU comprises a processor for processing the received aggregated sensor data;
a plurality of daughter cards, wherein each daughter card of the plurality of daughter cards is removably connected to a respective zonal aggregator of the plurality of zonal aggregators;
wherein each respective daughter card comprises a respective controller, and wherein the respective controller controls a respective component of the equipped vehicle, and wherein the respective component controlled by the respective controller is based on a location of the respective zonal aggregator and respective daughter card within the equipped vehicle; and
wherein the respective component of the equipped vehicle comprises one selected from the group consisting of (i) an actuator, (ii) a motor, and (iii) a light source.

16. The vehicular sensing system of claim 15, wherein at least one of the plurality of daughter cards comprises a power supply independent from the respective zonal aggregator.

17. The vehicular sensing system of claim 15, wherein each zonal aggregator aggregates its received sensor data onto an Ethernet channel.

18. The vehicular sensing system of claim 15, wherein at least one daughter card of the plurality of daughter cards performs a diagnostic test on the respective component of the equipped vehicle.

19. The vehicular sensing system of claim 15, wherein at least one daughter card of the plurality of daughter cards comprises at least one bridge driver.

20. A vehicular sensing system, the vehicular sensing system comprising:
a plurality of sensors disposed at a vehicle equipped with the vehicular sensing system, each sensor of the plurality of sensors capturing respective sensor data, wherein the plurality of sensors comprises (i) at least one camera and (ii) at least one radar sensor;
a plurality of zonal aggregators, wherein each zonal aggregator of the plurality of zonal aggregators receives respective sensor data captured by at least two respective sensors of the plurality of sensors;
wherein each zonal aggregator of the plurality of zonal aggregators aggregates its received sensor data into respective aggregated sensor data;
an electronic control unit (ECU) comprising electronic circuitry and associated software;
wherein the ECU receives the respective aggregated sensor data from each respective zonal aggregator of the plurality of zonal aggregators;
wherein the electronic circuitry of the ECU comprises a processor for processing the received aggregated sensor data;
a plurality of daughter cards, wherein each daughter card of the plurality of daughter cards is removably connected to a respective zonal aggregator of the plurality of zonal aggregators;
wherein each respective daughter card comprises a respective controller, and wherein the respective controller controls a respective component of the equipped vehicle, and wherein the respective component controlled by the respective controller is based on a location of the respective zonal aggregator and respective daughter card within the equipped vehicle; and
wherein the respective component of the equipped vehicle comprises one selected from the group consisting of (i) an actuator, (ii) a motor, and (iii) a light source.

21. The vehicular sensing system of claim 20, wherein the plurality of zonal aggregators comprises (i) a first zonal aggregator disposed at a first location within the equipped vehicle and (i) a second zonal aggregator disposed at a second location within the equipped vehicle different than the location of the first zonal aggregator, and wherein a first daughter card of the plurality of daughter cards is removably connected to the first zonal aggregator and comprises a first controller different from a second controller of a second daughter card of the plurality of daughter cards that is removably connected to the second zonal aggregator, and wherein the first controller controls a first component of the equipped vehicle and the second controller controls a second component of the equipped vehicle, and wherein the first component is different than the second component.

22. The vehicular sensing system of claim 21, wherein the first component is located closer to the first zonal aggregator than the second zonal aggregator, and wherein the second component is located closer to the second zonal aggregator than the first zonal aggregator.

23. The vehicular sensing system of claim 21, wherein the first zonal aggregator and the second zonal aggregator are the same, and wherein the first daughter card and the second daughter card are different.

* * * * *